(No Model.) 2 Sheets—Sheet 1.

C. B. BOSWORTH & J. H. MILLETT.
STEAM GAGE.

No. 549,700. Patented Nov. 12, 1895.

WITNESSES
W. R. Singleton
C. H. Mayer

INVENTORS:
C. B. Bosworth
J. H. Millett
W. H. Singleton, Attorney (No Model.) 2 Sheets—Sheet 2.

C. B. BOSWORTH & J. H. MILLETT.
STEAM GAGE.

No. 549,700. Patented Nov. 12, 1895.

Witnesses
Wm R. Singleton
C N Hood

Inventors
C. B. Bosworth
J. H. Millett
per W. R. Singleton
Attorney

UNITED STATES PATENT OFFICE.

CHARLES BARTLETT BOSWORTH, OF EVERETT, AND JOSHUA H. MILLETT, OF MALDEN, ASSIGNORS TO THE CROSBY STEAM GAGE AND VALVE COMPANY, OF BOSTON, MASSACHUSETTS.

STEAM-GAGE.

SPECIFICATION forming part of Letters Patent No. 549,700, dated November 12, 1895.

Application filed March 15, 1895. Serial No. 541,857. (No model.)

*To all whom it may concern:*

Be it known that we, CHARLES BARTLETT BOSWORTH, residing at Everett, and JOSHUA H. MILLETT, residing at Malden, in the county of Middlesex and State of Massachusetts, citizens of the United States, have invented certain new and useful Improvements in Steam-Gages; and we do hereby declare the following to be a full, clear, and exact description of the invention, such as will enable others skilled in the art to which it appertains to make and use the same.

This invention relates to an improvement in steam-gages, more especially that class of steam-gages known as "registering."

The object of the invention is to correct the error due to the expansion of any part or parts of such a steam-gage. In use it has been found that not only sometimes will the internal parts of the gage, such as the tube-springs or the connections, will expand, but also even the case will sometimes expand. This variation of one or more parts of the gage of course affects the reliability of the gage and introduces a factor of uncertainty, which tends to keep the gage from being absolutely reliable. Actual tests, which have been carefully carried forward, have shown the very great importance of some compensating element in a steam-gage to overcome the error due to the expansion of parts, and especially the tube-spring from the radiating-head of the boiler, to which the gage is usually attached.

The invention consists, broadly, in introducing into a steam-gage a compensating thermostat. With such a device constituting part of the steam-gage, this thermostat acting as a compensating medium, any error due to variations of temperature will be corrected by the action of the thermostat.

Figure 1:
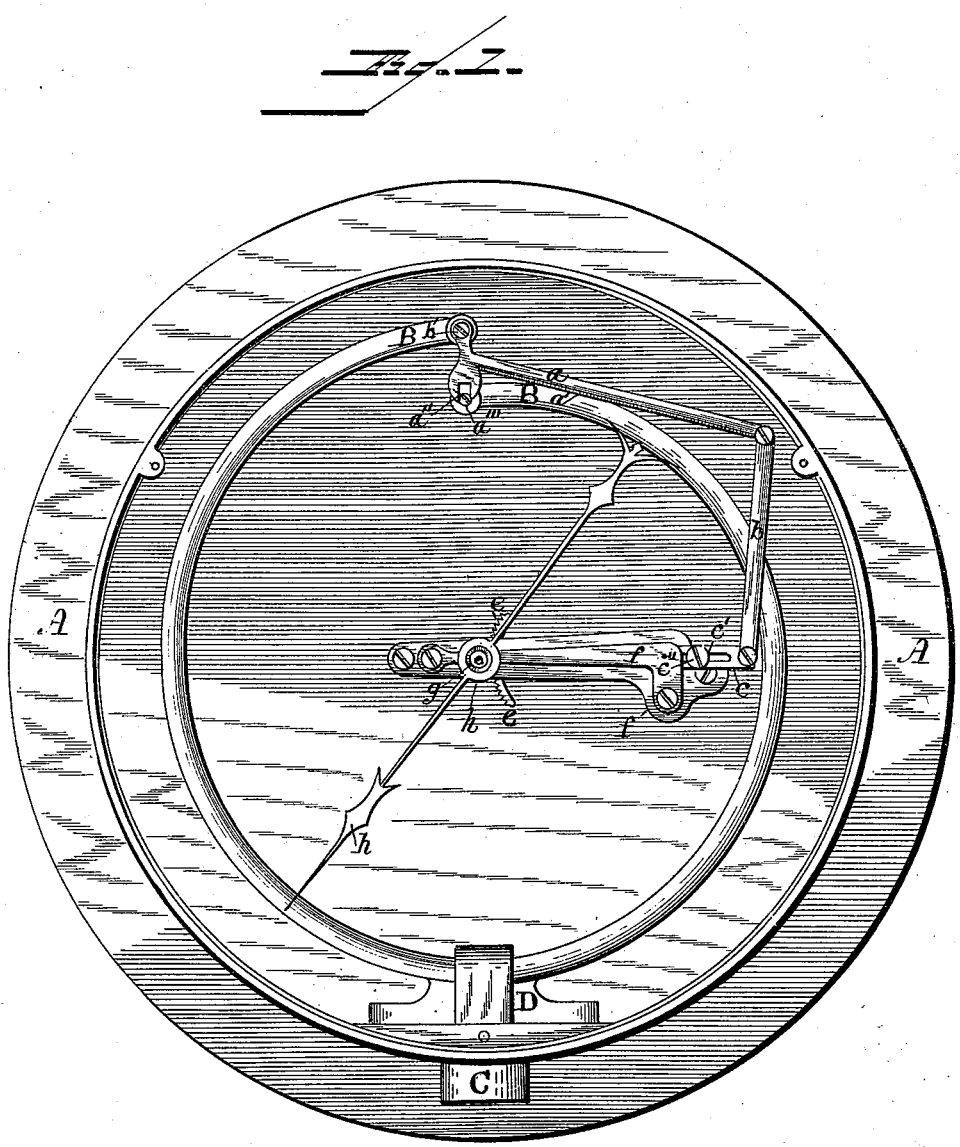
Figure 2:
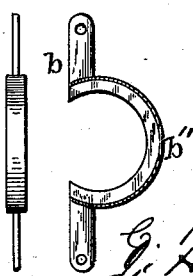
Figure 3:
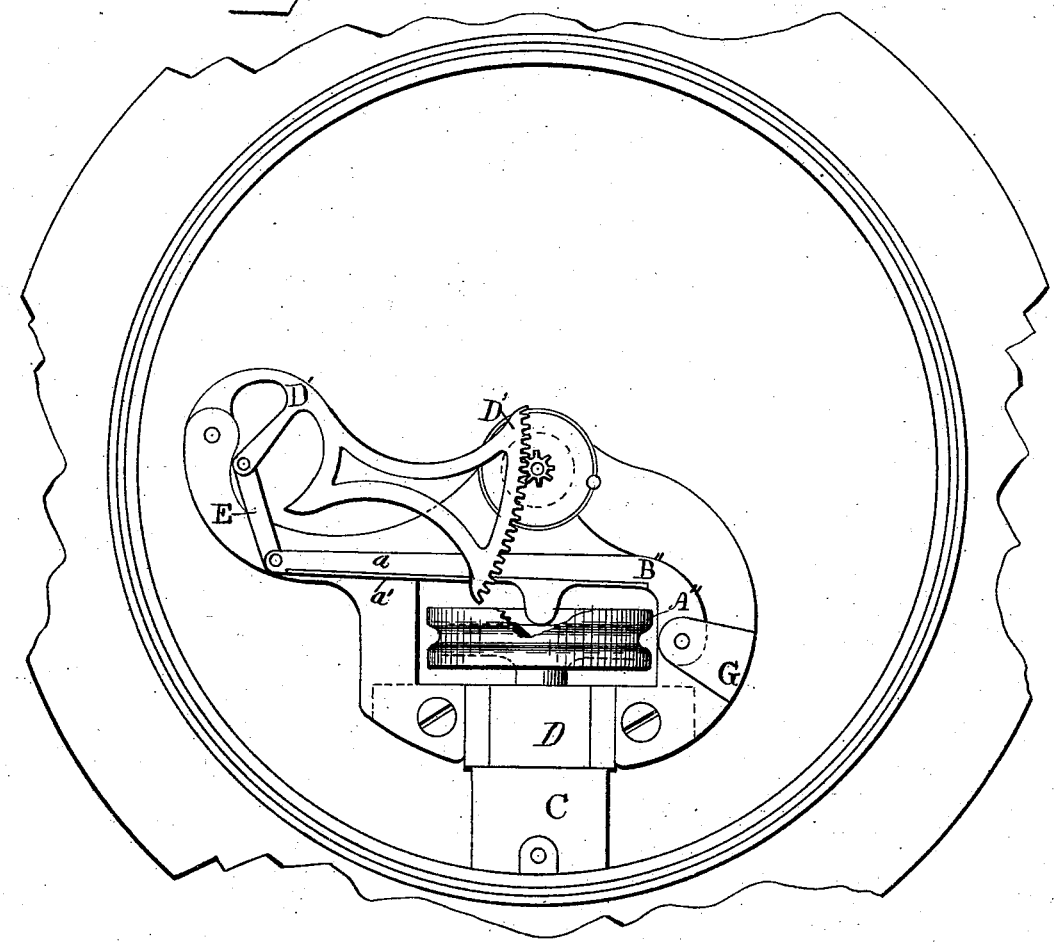
Figure 4:
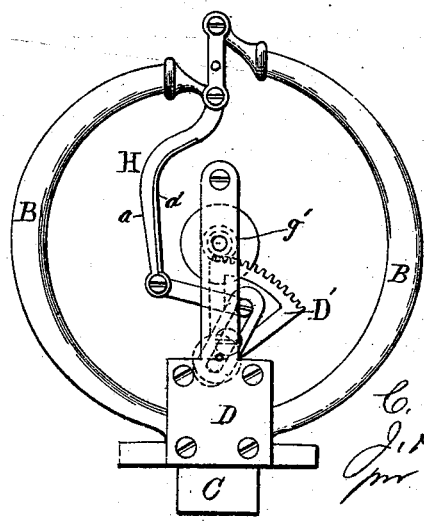

In the accompanying drawings, forming part of this specification, Figure 1 is an inside view of the working machinery of a gage wherein a Bourdon tube is used, the case, dial-card, and clockwork being removed. Fig. 2 is a modification of the link-bar. Fig. 3 represents part of a gage where a diaphragm is used. Fig. 4 represents a modification of Fig. 1, where a Bourdon tube is used.

A is the bed-plate on which the working parts are secured. B is a double Bourdon tube. C is the steam-pipe. D is the standard in which the tubes B and C are fastened. $a$ is a brass lever pivoted to the outer end of the tube B at $b'$, having soldered to the inner edge of the long arm a steel strip $a'$. The lever $a$ is pivoted at one end of the cross-bar to the outer end of the Bourdon tube B at $b'$, and in the other end is a slot $a''$, which moves over a screw-pin $a'''$ on the end of the tube B. The end of the lever $a$ is pivoted to a link $b$, which link $b$ at its other end is pivoted to the outer end of a bar $c$, in which end is a slot $c'$, by which slot and a screw $c''$ the bar $c$ is made adjustable on the arm $d$ of a segment-rack $e$. The arm $d$ is immediately beneath the frame $f$ and it is not shown in the drawings. The segment-rack $e$ works with the pinion, which is on the shaft $g$, which carries the index-arrow $h$, and is not seen in Fig. 1, being covered by the frame $f$ and central part of the index-arrow $h$, but is shown in Figs. 3 and 5. All of these parts, which are well known, require no further description, being in common use in steam-gages with the movement of the index-arrow.

In Fig. 2 is a modification of the link-bar $b$. The main part is of brass, and immediately around the curved part is soldered a steel strip $b''$.

When the curved link is used, the lever $a$ may be a plain bar. When the lever $a$ is a thermal bar, then the straight link $b$ is employed, as shown in the drawings, Fig. 1. The two thermal bars are not necessarily used together.

The thermal bar is intended for use in any form of gage whatever where great heat is radiated from the boiler, so as to cause the expansion of the levers and connectory bars, by which the movements of the tube or diaphragm are conveyed to the index-spindle.

The gage, with the thermal bar or bars, is specially for use on portable boilers, where it has to be attached to them or so near as to be affected by the great heat radiated therefrom.

The slot $a''$ in one end of the cross-piece of the lever $a$, Fig. 1, is operated by the pin $a'''$ on the inner end of the double-spring tube B, so that the least expansion of the spring will move the lever $a$; also the same effect is produced by the expansion of the outer end of the double-spring tube.

It will be seen that the device already described constitutes a thermal compensating medium introduced between the indicating mechanism of the gage and the steam-pressure mechanism. Hence in variations of temperature either the steam-pressure mechanism or the connecting parts will be compensated for by the thermal medium and not be transferred to the indicating mechanism. By the use of this thermostatic device the indicating mechanism remains constant in its action whatever may be the variations in the several parts of the steam-gage.

In Fig. 3 A″ represents a diaphragm, upon which rests a thermal lever B″. The short arm of lever B″ is attached to a bracket G, and the long arm is attached to a sector D′ by the intermediate link E. The lever B″ is composed of two metals. The upper $a$ is of brass and the lower $a'$ is of steel.

Any pressure of steam entering the diaphragm from a pipe to which the gage is attached to the boiler raises the diaphragm and lifts the thermal lever B″, thus operating the sector and the other mechanism of the gage for recording such pressure. The thermal lever B″ when the gage is subjected to a high degree of temperature deflects downwardly, due to its construction, and thus compensates by its retreating movement for any advancing movement due to the expansion of the diaphragm and its parts.

In Fig. 4 B represents the double Bourdon springs, which are anchored to the socket D, to which is attached the steam-pipe C of a boiler. H is a vertical thermal lever which connects the free ends of the tube B. The lower end is connected by intermediate mechanism to the sector D′ and pinion $g'$ of the steam-gage, which operates the index for registering the pressure to which the springs are subjected. This vertical lever H is constructed as a thermostat, similar to the others already described. In this case any undue expansion of the tubes, due to a high temperature in which they may be immersed, will cause a movement downward or toward the pinion, thus causing the index through the intermediate mechanism to retreat or fall behind sufficiently to compenate for its advance, due to the expansion of the tubes.

Having described our invention, what we claim is—

1. A steam gage having a compensating thermostat as part of its mechanism, as set forth.

2. In a steam gage a thermal compensating medium between the indicating mechanism and the steam pressure mechanism, as set forth.

3. In a steam gage having a Bourdon tube spring, the combination of such tube spring with a lever composed of two different metals forming a thermostat or thermal bar, such lever connecting the free ends of the tube spring and the intermediate mechanism to convey the movements thereof to the index, substantially as described.

4. In a steam gage, the lever, $a$, composed of two different metals, one end of the cross-piece being pivoted to the outer end of the double spring tube, and the other end being provided with a slot; and a pin on the inner end of the spring tube, in combination with the double spring tube, and the link connected with the arm of the segment rack, substantially as and for the purpose described.

In testimony whereof we affix our signatures in presence of two witnesses.

CHARLES BARTLETT BOSWORTH.
JOSHUA H. MILLETT.

Witnesses:
ARTHUR L. BOWKER,
GEO. H. EAGER.